(12) United States Patent
Shin et al.

(10) Patent No.: US 6,292,943 B1
(45) Date of Patent: Sep. 18, 2001

(54) POWER CONTROL METHOD FOR SET TOP BOX

(75) Inventors: Yun-Soo Shin; Jin-Hwi Kim, both of Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/206,168

(22) Filed: Dec. 7, 1998

(30) Foreign Application Priority Data

Dec. 10, 1997 (KR) .................................. 97-67521

(51) Int. Cl.[7] ........................... H04N 5/445; H04N 7/173
(52) U.S. Cl. ........................... 725/58; 725/100; 725/131; 348/460; 348/730
(58) Field of Search ........................ 348/5, 6, 9, 632, 348/633, 730, 460; 386/1, 46, 83; 725/58, 131, 100, 133, 141, 153

(56) References Cited

U.S. PATENT DOCUMENTS

| | | | |
|---|---|---|---|
| 4,733,301 | * | 3/1988 | Wright, Jr. ............................ 358/181 |
| 5,140,419 | * | 8/1992 | Galumbeck et al. .................. 358/142 |
| 5,517,256 | * | 5/1996 | Hashimoto ............................ 348/731 |
| 5,543,933 | * | 8/1996 | Kang et al. ........................... 358/335 |
| 5,598,276 | * | 1/1997 | Cookson et al. ....................... 386/46 |
| 5,737,477 | * | 4/1998 | Tsutsumi .............................. 386/83 |
| 5,856,852 | * | 6/1999 | Huh ..................................... 348/460 |
| 6,067,121 | * | 5/2000 | Shigihara ............................. 348/473 |
| 6,097,377 | * | 8/2000 | Yeo ..................................... 345/211 |

* cited by examiner

Primary Examiner—Andrew Faile
Assistant Examiner—Kieu-Oanh Bui
(74) Attorney, Agent, or Firm—Sughrue, Mion, Zinn, Macpeak & Seas, PLLC

(57) ABSTRACT

A power control method for a set top box is disclosed. The method includes a first step for setting a time reserving and recording function for recording a broadcasting signal received from a set top box, a second step for recording the broadcasting signal in accordance with the time reserving and recording function of the first step, a third step for judging whether or not a synchronous signal is inputted into a broadcasting signal recording apparatus through a signal cable connected with the set top box during the operation of the second step, a fourth step for continuously performing a time reserving and recording function when it is judged that the synchronous signal is inputted into the broadcasting signal recording apparatus as a result of the third step, a fifth step for outputting a power code or channel code to the set top box when it is judged that the synchronous signal is not inputted into the broadcasting signal recording apparatus as a result of the third step, and a sixth step for performing the fourth step when the synchronous signal is inputted as a result of the judgment that the synchronous signal is inputted into the broadcasting signal recording apparatus after the fifth step, for thereby controlling the power of a set top box in accordance with whether there is a synchronous signal applied to the broadcasting signal recording apparatus when the power of the set top box is OFF.

6 Claims, 2 Drawing Sheets

POWER CONTROL METHOD FOR SET TOP BOX

BACKGROUND OF THE INVENTION

1. Field of the Invention

The present invention relates to a power control method for a set top box, and, in particular, to an improved power control method for a set top box which is capable of controlling a power of a set top box in accordance with whether or not there is a synchronous signal applied to a VCR in a state of power-off when recording a broadcasting signal received through the set top box using a broadcast recording apparatus such as the VCR.

2. Description of the Conventional Art new paragraph:

Generally, in order to watch various broadcast programs through a cable network, a public wave broadcasting network, a satellite broadcasting network, etc, at home or office, a set top box, a cable box, ect. are needed.

This set top box or cable box receives the broadcasting signal received through a cable in a modulated signal state from each broadcasting company, so that a user can watch the program on the television set.

When receiving the broadcasting signals by the set top box and watching the program on the television set, the user connects the set top box and the VCR, and the VCR and the television set using an audio/video input line, so that the user can watch the program on the television set using the set top box.

At this time, when performing a channel selection and power control of the set top box using the VCR, a corresponding channel code and power code are transmitted to the set top box using the VCR for thereby controlling the channel selection and power control.

In addition, differently from this, the channel selection and power control may be implemented using only a channel code.

If the user can not watch the program broadcasted by a predetermined channel for a predetermined time due to other schedules, the user can record the program using a time reserve function by setting the channel and time of the program for thereby recording a corresponding broadcasting program.

Namely, after the recording time is set by the user, when the time is reached, a channel code or power code is transmitted to the set top box from the VCR, and then the set top box is operated, so that the broadcasting program reserved by the user is recorded.

However, if the set top box if OFF due to temporary power failure of the power at the time when the broadcasting signal received through the set top box is recorded into the VCR based on the reserved program recording function, the broadcasting signal is received into the set top box, so that the VCR does not recognize this situation, and the VCR continuously proceeds with the recording operation.

Therefore, actually, the broadcasting signal is not recorded into the VCR.

In addition, if the set top box is OFF due to the power failure, etc., even when the VCR has a function that the power code is transferred from the VCR to the set top box, since the VCR does not recognize the power state of the set top box, the power code is outputted from the VCR in a state that the set top box is in an operation mode. Therefore, the broadcasting signal is not received, so that the broadcasting signal is not recorded into the VCR.

SUMMARY OF THE INVENTION

Accordingly, it is an object of the present invention to provide a virtual power control method for a set tap box which overcomes the aforementioned problems encountered in the conventional art.

It is another object of the present invention to provide a power control method for a set top box which is capable of controlling the power of a set top box in accordance with whether there is a synchronous signal applied to the broadcasting signal recording apparatus when the power of the set top box is OFF due to various reasons, such as a temporary power failure, at the time when a broadcasting signal received through the set top box is recorded based on a program reserving and recording function using a broadcasting signal recording apparatus such as a VCR, etc.

In order to achieve the above objects, there is provided a power control method for a set top box which includes a first step for setting a time reserving and recording function for recording a broadcasting signal received from a set top box, a second step for recording the broadcasting signal in accordance with the time reserving and recording function of the first step, a third step for judging whether or not a synchronous signal is inputted into a broadcasting signal recording apparatus through a signal cable connected with the set top box during the operation of the second step, a fourth step for continuously performing a time reserving and recording function when it is judged that the synchronous signal is inputted into the broadcasting signal recording apparatus as a result of the third step, a fifth step for outputting a power code or channel code to the set top box when it is judged that the synchronous signal is not inputted into the broadcasting signal recording apparatus as a result of the third step, and a sixth step for performing the fourth step when the synchronous signal is inputted as a result of the judgment that the synchronous signal is inputted into the broadcasting signal recording apparatus after the fifth step.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The embodiment of the present invention will be explained with an example that a power failure occurs with reference to the accompanying drawings.

Figure 1:
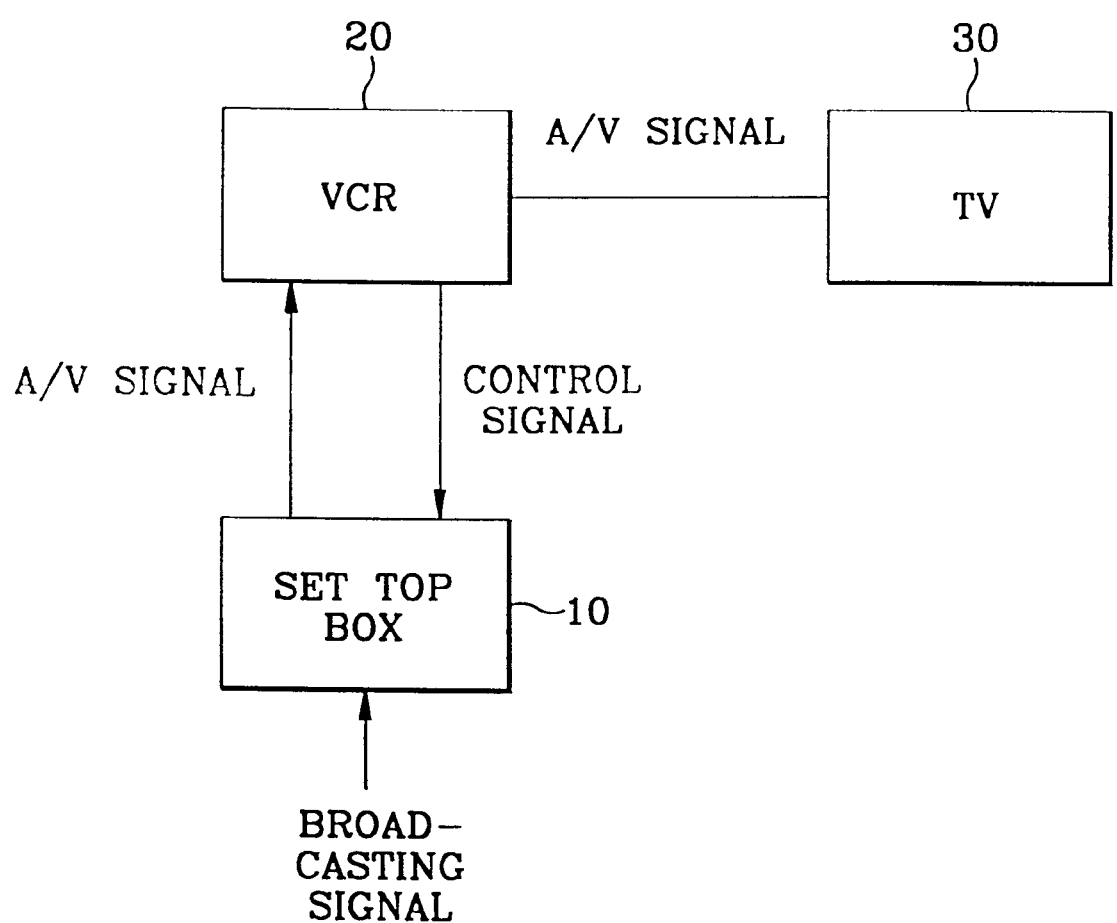
FIG. 1 is a schematic block diagram illustrating a product connection state for controlling the power of a set top box through a VCR according to the present invention.

FIG. 1 is a schematic block diagram illustrating a product connection for controlling the power of the set top box through a VCR according to the present invention.

As shown therein, a set top box 10 receives a modulated broadcasting signal from each broadcasting company and converts and outputs a corresponding broadcasting signal in accordance with a channel selection by a user.

A VCR 20 transfers the audio/video signals from the set top box 10 to a television set(TV) 30, so that the user watches a predetermined program on the TV 30.

At this time, the set top box 10 and the VCR 20, and the VCR 20 and the TV 30 are connected by a signal cable.

Figure 2:
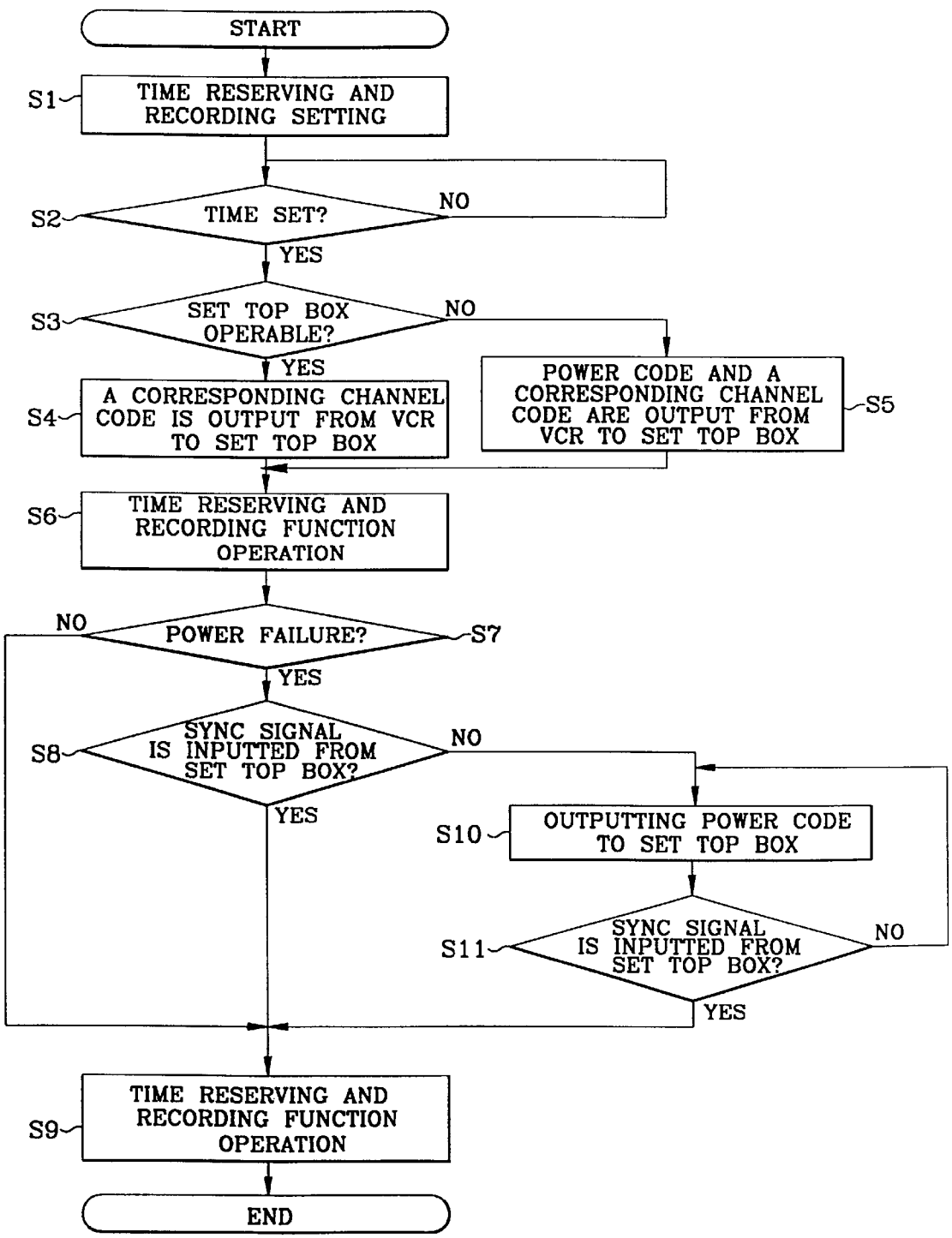
FIG. 2 is a flow chart illustrating a power control method for a set top box through a VCR according to the present invention.

The operation of the power control method of the set top box according to the present invention will be explained with reference to FIG. 2.

First, if the user can not watch a predetermined program from a predetermined channel due to other schedules, the user sets a time reserving and recording function for recording the broadcasting signal of a predetermined channel at a predetermined time received from the set top box 10 using the VCR 20 in Step S1.

After setting the time reserving and recording function, the VCR 20 judges whether the set time is reached in Step S2. If the set time is reached, the power is turned on, and then the VCR 20 judges whether or not the set top box 10 is operable in Step S3.

As a result of the judgment of the step S3, if the set top box 10 is operable, a code of a corresponding channel is outputted from the VCR 20 to the set top box 10 in Step S4. If the set top box 10 is not operable, a power code and channel code are outputted from the VCR 20 to the set top box 10 in Step S5.

Therefore, the set top box 10 is operated in accordance with the power code and channel code outputted in the steps S4 and S5, and the VCR 20 starts recording the broadcasting signal in Step S6.

During the recording operation of the program by the VCR 20, if a power failure occurs, the VCR 20 becomes ON and continuously performs a previously set function in Step S7 and judges whether or not a synchronous signal is inputted into the VCR 20 through the signal cable connected with the set top box 10 in Step S8.

As a result of the a judgment, when the synchronous signal is inputted through the signal cable connected with the set top box 10, the time reserved and recording operation set by the user is continuously performed in Step S9.

However, as a result of the a judgment of the step S8, if the synchronous signal is not inputted through the signal cable connected with the set top box 10, the power code is outputted from the VCR 20 for turning on the power of the set top box 10 in Step S10.

After the power code is outputted, the VCR 20 judges whether or not the synchronous signal is inputted through the signal cable connected with the set top box 10 in Step S11. As a result of the a judgment, if the synchronous signal is inputted, the time reserved and recording operation set by the user is continuously performed.

Namely, after the power code is outputted from the VCR 20 to the set top box 10, when the synchronous signal is inputted into the VCR 20, it means that the power of the set top box 10 is turned on, and the time reserved and recording operation set by the user is normally performed. Therefore, it is possible to continuously perform the time reserved and recording operation using the VCR 20.

The power control method according to the present invention was explained based on some embodiments. But the same is not limited thereto. Namely, the present invention may be adapted to the cable box and all kinds of the apparatuses which receive the broadcasting signals.

In addition, in this specification, the example for controlling the set top box, etc. using the VCR was provided.

The same is not limited thereto. Namely, the present invention may be adapted to DVD-RAM and any apparatuses which are capable of recording the broadcasting signal As described above, in the present invention, it is possible to prevent a non-signal recording by judging whether or not a synchronous signal is applied from the set top box at the VCR and controlling the power of the set top box so that the set top box always keeps an operable state even when the set top box is OFF due to a temporary power failure, etc. when recording a broadcasting signal from the set top box based on the time reserving and recording function.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A power control method for a set top box, comprising:
   a first step for setting a time reserving and recording function for recording a broadcasting signal received from the set top box;
   a second step for recording the broadcasting signal in accordance with the time reserving and recording function set in the first step;
   a third step for continuously judging whether a synchronous signal is input into a broadcasting signal recording apparatus through a signal cable connected with the set top box during the operation of the second step;
   a fourth step for continuously performing the recording of said second step, while it is judged by said third step that the synchronous signal is input into the broadcasting signal recording apparatus;
   a fifth step for outputting a power code or channel code to the set top box when it is judged by said third step that the synchronous signal is not input into the broadcasting signal recording apparatus; and
   a sixth step for performing the fourth step when the synchronous signal is input as a result of the judgment that the synchronous signal is input into the broadcasting signal recording apparatus after the fifth step.

2. The power control method of claim 1, wherein when the synchronous signal is judged not input, after said fifth step, even after the power code or channel code has been output, repeating the fifth step.

3. A power control method for a broadcasting signal receiver, comprising:
   a first step for setting a time reserving and recording function for recording a broadcasting signal received from the broadcasting signal receiver;
   a second step for recording the broadcasting signal in accordance with the time reserving and recording function set in the first step;
   a third step for continuously judging whether a synchronous signal is input into a broadcasting signal recording apparatus through a signal cable connected with the broadcasting signal receiver during the operation of the second step;

a fourth step for continuously performing the recording of said second step, while it is judged by said third step that the synchronous signal is input into the broadcasting signal recording apparatus;

a fifth step for outputting a channel code to the broadcasting signal receiver when it is judged by said third step that the synchronous signal is not input into the broadcasting signal recording apparatus; and a sixth step for performing the fourth step when the synchronous signal is input as a result of the judgment that the synchronous signal is input into the broadcasting signal recording apparatus after the fifth step.

4. The power control method of claim 3, wherein when the synchronous signal is judged not input, after said fifth step, even after the channel code has been output, repeating the fifth step.

5. A power control method for a broadcasting signal receiver, comprising:

a first step for setting a time reserving and recording function for recording a broadcasting signal received from the broadcasting signal receiver;

a second step for recording the broadcasting signal in accordance with the time reserving and recording function set in the first step;

a third step for continuously judging whether a synchronous signal is input into a broadcasting signal recording apparatus through a signal cable connected with the broadcasting signal receiver during the operation of the second step;

a fourth step for continuously performing the recording of said second step, while it is judged by said third step that the synchronous signal is input into the broadcasting signal recording apparatus;

a fifth step for outputting a power code to the broadcasting signal receiver when it is judged by said third step that the synchronous signal is not input into the broadcasting signal recording apparatus; and a sixth step for performing the fourth step when the synchronous signal is input as a result of the judgement that the synchronous signal is input into the broadcasting signal recording apparatus after the fifth step.

6. The power control method of claim 5, wherein when the synchronous signal is judged not input, after said fifth step, even after the power code has been output, repeating the fifth step.

* * * * *